United States Patent [19]
Martin

[11] 4,354,572
[45] * Oct. 19, 1982

[54] PORTABLE SEISMIC ENERGY SOURCE

[75] Inventor: Philip N. Martin, Tulsa, Okla.

[73] Assignee: Mapco, Inc., Tulsa, Okla.

[*] Notice: The portion of the term of this patent subsequent to Sep. 23, 1997, has been disclaimed.

[21] Appl. No.: 146,786

[22] Filed: May 5, 1980

Related U.S. Application Data

[63] Continuation-in-part of Ser. No. 963,982, Nov. 27, 1978, Pat. No. 4,223,759.

[51] Int. Cl.³ .............................................. G01V 1/104
[52] U.S. Cl. ..................................... 181/116; 181/114; 181/401; 367/75; 89/37 K
[58] Field of Search ............... 181/113, 114, 116, 117, 181/119, 121; 89/37 C, 37 K

[56] References Cited

U.S. PATENT DOCUMENTS

| | | | |
|---|---|---|---|
| 2,698,755 | 1/1955 | Poulter | 181/116 |
| 2,724,452 | 11/1955 | Sarge | 181/116 |
| 3,159,079 | 12/1964 | Hildebrand | 89/37 K |
| 3,215,223 | 11/1965 | Kirby et al. | 181/117 |
| 3,216,320 | 11/1965 | Thomas et al. | 89/1 R |
| 3,232,168 | 2/1966 | Mangeng et al. | 89/40 R |
| 3,385,165 | 5/1968 | Hildebrandt et al. | 89/37 K |
| 3,752,256 | 8/1973 | Mollere | 181/117 |
| 3,845,687 | 11/1974 | Waeber | 89/37 K |
| 4,011,924 | 3/1977 | Barbier | 181/121 |
| 4,012,986 | 3/1977 | Germerhausen et al. | 89/37 C |
| 4,026,190 | 5/1977 | Blair | 89/37 C |
| 4,059,820 | 11/1977 | Turpening | 181/116 |
| 4,064,964 | 12/1977 | Norden et al. | 181/121 |
| 4,223,759 | 9/1980 | Martin | 181/114 |

FOREIGN PATENT DOCUMENTS

| | | | |
|---|---|---|---|
| 944472 | 3/1974 | Canada | 181/113 |
| 473140 | 9/1975 | U.S.S.R. | 181/117 |

Primary Examiner—Howard A. Birmiel
Attorney, Agent, or Firm—Head, Johnson & Stevenson

[57] ABSTRACT

A portable seismic energy source having a base for resting on the earth's surface, a gun providing a means of firing a projectile to impact the earth and generate a seismic signal and a ball and socket to mount the gun on the base to permit the projectile fired by the gun to strike the surface of the earth at a selectable angle.

3 Claims, 4 Drawing Figures

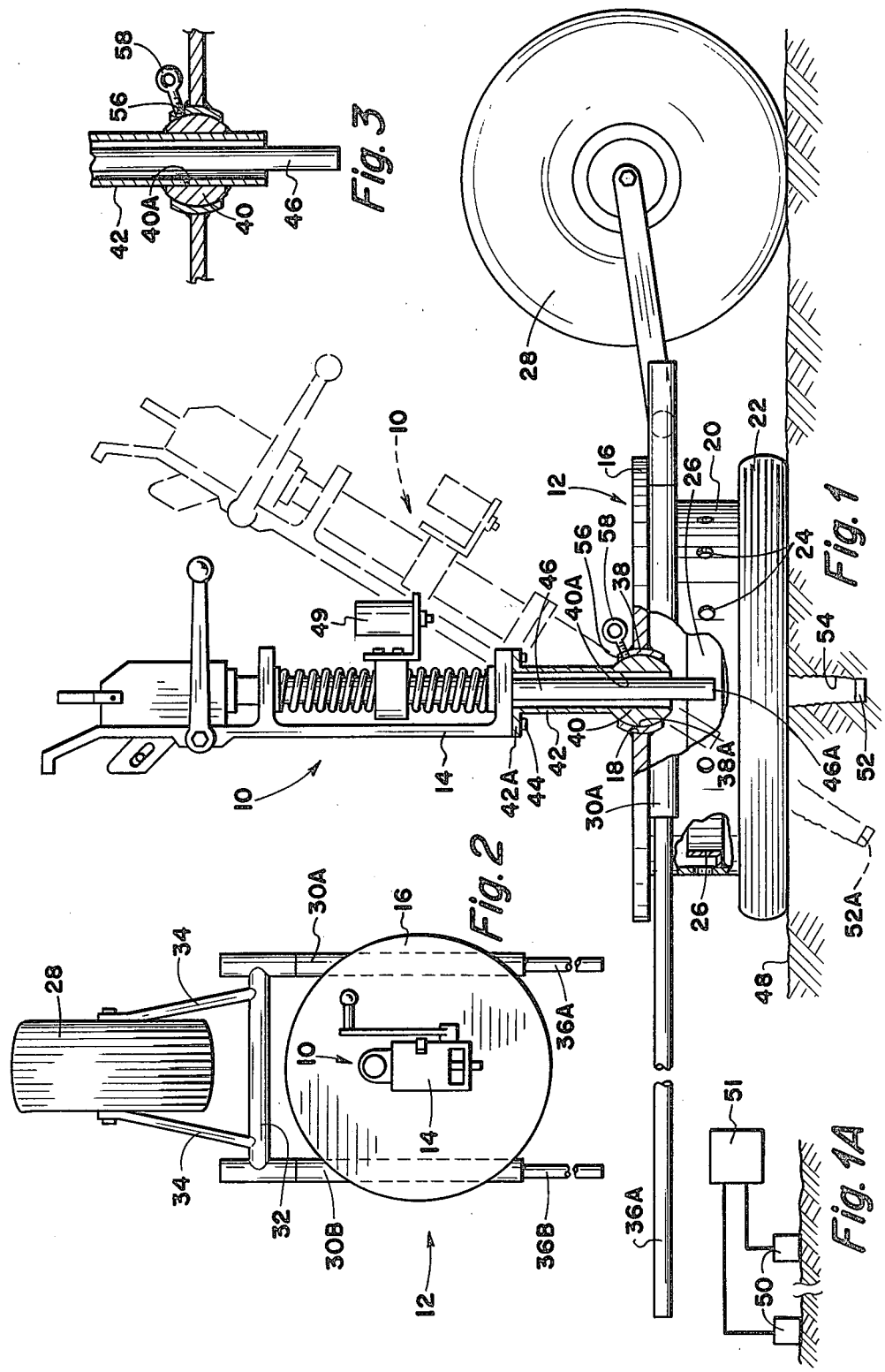

PORTABLE SEISMIC ENERGY SOURCE

CROSS-REFERENCE TO RELATED APPLICATION

This is a continuation-in-part of Application Ser. No. 963,982 entitled "Low Energy Source for Seismic Operation," filed Nov. 27, 1978, now U.S. Pat. No. 4,223,759.

BACKGROUND OF THE INVENTION

1. Field of the Invention

This invention is related to an apparatus for generating seismic signals and particularly to an apparatus for providing a projectile impact with the earth wherein the angle of impact with the earth may be selected.

2. Description of the Prior Art

The co-pending application above referenced describes an apparatus and a method for generating and utilizing seismic signals. Briefly, the apparatus includes a projectile firing means mounted on a base movable over the surface of the earth. The method includes firing a projectile to impact the earth to generate seismic signals and detecting the seismic signals.

In the co-pending application the projectile firing device is mounted to fire the projectile vertically into the earth. In some types of geophysical exploration it becomes desirable to directionally orient the impact of seismic generating projectiles.

It is therefore an object of this invention to provide an improved means for generating seismic signals by means of impacting a projectile into the earth's surface wherein the angle of impact of the projectile may be selected.

This general object as well as others will be fulfilled in the following description and claims, taken in conjunction with the attached drawings.

SUMMARY OF THE INVENTION

A portable seismic energy generating source including a base having an upper plate. The base includes a lower circumferential ground seal and means to vent gases created by projectile firing. The plate has a central opening therethrough. A socket member is mounted in the opening in the plate. The interior surface of the socket member is defined by a double truncated sphere, that is, a sphere cut by parallel planes at the top and bottom. A ball member having an opening therethrough is rotatably received within the socket member. A tubular gun support is received within the opening in the spherical member and a gun is secured to the gun support with the muzzle of the gun being axially received by the tubular gun support. By the swivel socket arrangement afforded by the socket member and ball member, the direction of the gun muzzle may be varied so that the projectile, when fired by the gun, impacts the earth at a selectable angle. Means is provided for retaining the gun at the angle selected preparatory to firing the gun.

DESCRIPTION OF THE DRAWINGS

FIG. 1 is an elevational view of a preferred embodiment of the invention, shown partly in cross-section and showing, in solid outline, the seismic energy source orientated for firing a projectile vertically into the earth, and in dotted outline, the orientation whereby the projectile may be fired at a selected angle into the earth.

FIG. 1A shows diagrammatically means for receiving and recording reflected seismic energy.

FIG. 2 is a plan view, on a reduced scale, of the embodiment of FIG. 1.

FIG. 3 is a fragmentary elevational cross-sectional view of an arrangement of the ball and socket employed in the apparatus.

DETAILED DESCRIPTION OF THE PREFERRED EMBODIMENT

Referring to FIGS. 1 and 2, an apparatus which embodies the principle of this invention is illustrated. The seismic generating device includes two basic portions, that is, a projectile firing apparatus or gun generally indicated by the numeral 10, and a base generally indicated by the numeral 12. The gun 10 is of a large calibre, preferably such as an 8-gauge industrial type gun. A manually operated gun is illustrated although an electrically fired gun may also be employed and, in most instances, is preferable. The gun includes a frame 14.

Base 12 is formed of an upper plate 16 which is normally substantially horizontal relative to the earth and will normally depart from horizontal only if the location on which the base 12 is positioned is inclined to the horizontal. The upper plate 16 has a central opening 18 therein. Affixed to the lower surface of upper plate 16 is a circumferential rim 20 and at the lower end of rim 20 is a ground seal means such as a tire 22. The rim 20 has a plurality of openings 24 therearound spaced between the top and bottom. The openings 24 function as vents to permit the escape of gas generated when a projectile is fired. To prevent the inadvertent dislodgement of rock, dirt, or other debris from being ejected out through openings 24 when a projectile is fired, an internal shield 26 is employed. The shield is circumferential and in cross-section is of L-shaped configuration with the lower horizontal portion of the shield welded to the interior circumferential surface of rim 20. Thus it can be seen that if any physical object is dislodged by the impact of a projectile with the earth or by the gas of combustion, it is completely retained by the upper plate 16, rim 20, ground seal 22 and the internal shield 26, while permitting gas to freely pass through openings 24.

The seismic energy source is easily transportable by means of wheel 28. Tubular members 30A and 30B are fixed to each side of the rim 20 below top plate 16. A cross member 32 extends between the tubular members 30A and 30B forwardly of the base 12 and wheel support structures 34 attached to the cross-member 32 providing means for rotatably supporting wheel 28. To provide means where the seismic energy source may be easily moved, handlebars 36A and 36B extend from the tubular members 30A and 30B. An operator, walking between the handlebars 36A and 36B, can move the seismic energy source to selected positions on the surface of the earth in the same manner as moving a wheelbarrow.

When positioned on the earth preparatory to firing a shot to generate seismic signals, the seal 22 is preferably in firm engagement with the ground, that is, wherein little weight, if any, rests on wheel 28. While in FIG. 1 the wheel is shown touching on the ground, it can be seen that the structure may be arranged such that when sitting on the earth in firing position the wheel 28 is out of engagement with the ground and all of the weight of the seismic source is supported by ground seal 22.

Retained in opening 18 in top plate 16 is a socket member 38. The external configuration of socket 38 is not important, however, the internal surface 38A is preferably in the form of a portion of a sphere. Most particularly, in the illustrated embodiment, the internal surface 28 is a double truncated sphere, that is, one cut off at the top and bottom by parallel planes. Rotatably received within socket 38 is a ball member 40 which has an axial opening 40A therethrough. Ball 40 is, like the socket 38, truncated at the top and bottom by parallel planes. Affixed to the upper end of ball 40 and in alignment with opening 40A, is a tubular gun support member 42. The upper end of the gun support member 42 provides a flange 42A and by means of bolts 44 the frame 14 of the gun is secured to the support. Gun 10 includes a muzzle 46 which extends axially within the gun support 42 and ball 40, the lower end 46A terminating below the ball and within the confines of rim 20 and above the earth's surface 48.

A transponder or signal generating device 49 is shown supported to the gun 10 to provide an electrical signal when the gun is fired. This electrical signal is utilized in conjunction with the recorded seismic signals which are detected by geophones 50 (See FIG. 1A) placed on the earth's surface 48 at speed intervals. Seismic energy detected by geophones 50 is conveyed to recorder 51 in the typical and well-known manner in which seismic energy signals are utilized to provide information concerning subterranean structures.

When the seismic energy source is fired, a projectile is passed downwardly out the muzzle end 46A of the gun and impacts the earth, the projectile being indicated by the numeral 52. As the projectile impacts the earth it penetrates a distance depending upon the solidity of the earth at the point of impact, that is, whether the earth is at that point rocky, sandy, muddy and so forth. As the projectile 52 impacts the earth the inertial energy is absorbed, creating a seismic disturbance signal which travels from the point of impact and is reflected by various stratas within the earth's surface to geophones 50. These detected reflections stored by recorder 51 are utilized by geophysicists to gain increased understanding of the structure of the earth below surface 48.

As has been previously stated, in certain types of geophysical exploration, which are well known to those of experience in the art of seismic exploration, it is desirable in some instances to generate a seismic signal by an impact which is other than vertical with the earth. By provision of the ball and socket arrangement, the gun 10 may be oriented at an angle relative to the earth's surface 48 as illustrated in dotted outline in FIG. 1. When so oriented, the projectile 52A impacts the earth at an angle relative to the horizontal and relative to the inclination of the earth's surface 48 at the point of impact. The angular impact of projectile 52A generates a seismic signal which has a directionally oriented characteristic useful to geophysicists in analyzing the signals reflected therefrom. It can be seen that the gun 10 may be positioned at various angles for a full 360° around the vertical.

Another advantage of the directionally oriented seismic signal source is that it permits multiple firings of projectiles from the same location without moving the base. When a projectile 52 impacts the earth, it creates a passageway 54 and to avoid a subsequent shot entering the passageway 54, the gun 10 may be inclined at an angle so that a new point of impact with the surface of the earth 48 is achieved. This advantage exists even though the angle of deviation of the gun from the vertical is small and irrespective of any advantage in the type of the seismic signal generated by the angular discharge of the projectile into the earth.

FIG. 3 shows a slightly alternate arrangement in which the opening 40A in ball 40 is of sufficient diameter to receive the tubular gun support 42 so that the gun support extends even with or slightly below the lower end of the ball member 40. The arrangement of FIG. 3 is desirable from the standpoint of better structural relationship between gun support 42, ball 40, and socket 38; however, it does require a larger diameter ball and socket.

When an angle of the gun has been selected preparatory to firing it, it is desirable that a means be provided to retain the gun in the preselected position. For this purpose a threaded opening 56 is provided in the socket 38 above top plate 16. Threadably received in the opening 56 is a bolt 58. When the bolt 58 is loosened the gun may be positioned by the ball and socket arrangement in any selected angular orientation, including the vertical position as shown in solid outline in FIG. 1. Preparatory to firing and to retain the gun in the preselected position, bolt 58 is tightened. It can be seen that other means may be provided for affording a pivotal relationship between the gun and base plate 16 and for retaining the gun in such preselected angular position, all within keeping of the spirit and scope of this invention.

It is understood that the invention is not limited to the embodiments set forth herein for purposes of exemplification, but is to be limited only by the scope of the attached claim or claims, including the full range of equivalency to which each element thereof is entitled.

What is claimed is:

1. An improved portable seismic energy source comprising:
    a base having an upper plate and a lower circumferential ground seal means, the plate having an opening therethrough;
    a socket member mounted in said opening in said plate, the interior surface of said socket member being defined by a double truncated sphere;
    a ball member having an opening therethrough, said ball member being rotatably received within said socket member;
    a gun secured to said ball member having the barrel thereof in alignment with said ball member opening, the gun being thereby supported such that the angle of the gun barrel relative to the surface of the earth may be selected whereby a projectile fired by said gun passes through said ball member to strike the earth's surface beneath said base.

2. A portable seismic energy source according to claim 1 including:
    a tubular gun support member affixed to, and supporting, said gun, the barrel of said gun being in axial alignment therewith, and the gun support being affixed to said ball member in axial alignment with the opening therein.

3. A portable seismic energy source according to claim 1 including means to lock said ball member in selectable rotational relationships to said socket member and thereby to selectably lock the axes of said gun barrel to selectable angles relative to the earth's surface.

* * * * *